United States Patent
Horn et al.

(10) Patent No.: US 9,754,401 B2
(45) Date of Patent: Sep. 5, 2017

(54) SYSTEMS AND METHODS FOR ANIMATING SELECTED DATA INTO A LOGO

(71) Applicants: Scott Horn, Palo Alto, CA (US); Evelyn A Chua, San Jose, CA (US); Rick Wootten, Los Gatos, CA (US); Rich Silverstein, San Francisco, CA (US); Sarah Nguyen, New York, NY (US)

(72) Inventors: Scott Horn, Palo Alto, CA (US); Evelyn A Chua, San Jose, CA (US); Rick Wootten, Los Gatos, CA (US); Rich Silverstein, San Francisco, CA (US); Sarah Nguyen, New York, NY (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/575,362

(22) Filed: Dec. 18, 2014

(65) Prior Publication Data

US 2016/0180570 A1 Jun. 23, 2016

(51) Int. Cl.
*G06T 11/60* (2006.01)
*G06T 13/80* (2011.01)
*G06Q 30/02* (2012.01)

(52) U.S. Cl.
CPC ......... *G06T 13/80* (2013.01); *G06Q 30/0276* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 2012/0110491 A1* | 5/2012 | Cheung | G06T 11/60 715/771 |
| 2014/0355905 A1* | 12/2014 | Lipton | G06T 11/60 382/284 |

OTHER PUBLICATIONS

Stack Overflow, "Grab Instagram photo based on hashtags," http://stackoverflow.com/questions/13576122/grabinstagramphotobasedonhashtags, Apr. 17, 2014.*
Instagram, "Authentication," http://web.archive.org/web/20120430071622/http://instagram.com/developer/authenticataut, Apr. 30, 2012.*
Choujaa et al., "Towards Context-aware Face Anonymisation," MUM, 2008.*
Picture Mosaics, "inMotion Mosaics," https://web.archive.org/web/20131004080349/http://www.picturemosaics.com/video/, Oct. 4, 2013.*

* cited by examiner

*Primary Examiner* — Nicholas R Wilson
(74) *Attorney, Agent, or Firm* — Mikel R. Boeve

(57) ABSTRACT

The disclosed method comprises selecting a marketing target to visualize an impression related to a given brand logo, collecting, via a processor and a network interface, a number of relevant discrete visual or text based pieces of information related to the marketing target, visually displaying the pieces of information to the marketing target in an assorted state via an electronic display device, and automatically morphing the pieces of information from the assorted state into a collected state taking a shape of the given brand logo. Computerized systems with processors, network interfaces, and storage devices are also disclosed to facilitate the visual display methods coded in software.

20 Claims, 12 Drawing Sheets

SYSTEMS AND METHODS FOR ANIMATING SELECTED DATA INTO A LOGO

BRIEF SUMMARY

The present disclosure relates to methods and software for displaying selected data objects and animating a transition of those objects into a certain shape, such as a brand logo. In one embodiment the invention includes a non-transitory computer-readable medium that stores instructions executable by one or more processors to perform a method for animating a plurality of selected data objects into a logo. The method includes instructions for gathering the plurality of selected data objects about a selected subject, presenting the plurality of selected data objects visually, and animating a transition of the plurality of selected data objects into the logo.

In one particular embodiment, a method comprises selecting a marketing target to visualize an impression related to a given brand logo, collecting, via a processor and a network interface, a number of relevant discrete visual or text based pieces of information related to the marketing target, visually displaying the pieces of information to the marketing target in an assorted state via an electronic display device, and automatically morphing the pieces of information from the assorted state into a collected state taking a shape of the given brand logo.

In another particular embodiment, a system comprises a processor configured to execute gathering visual or textual files related to a brand logo, and a network interface to facilitate processor requests to gather visual or textual files from remote servers. A storage device to cache the visual or textual files related to the brand logo is also included, and a display device to show contents of the visual or textual files in a dispersed non-shaped format to a user, then the processor is utilized to animate a transition to an ordered shaped format to appear as the brand logo.

BRIEF DESCRIPTION OF THE DRAWINGS

The disclosure may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to a computer implemented method and display system for selectively gathering a set of data objects about a particular target or subject using a processor and a network interface, displaying those data objects via a physical display, and animating a transition of those data objects to make them form a shape such as a brand logo. This is a definite, non-abstract, concrete, actual method with physical outputs.

Electronic marketing is continually looking for ways to better reach potential marketing subjects like customers, businesses and the like. Providing a message about how a particular brand or company relates to a customer, consumer or business's day to day life is a powerful way to establish a strong brand in the eyes of the public. With the access to data available through various computer networks throughout the world, it is possible to collect data about a wide range of subjects or targets. The present invention relates to combining these methods and systems into a unique display output for presentation to a target, such as an individual.

Figure 1:
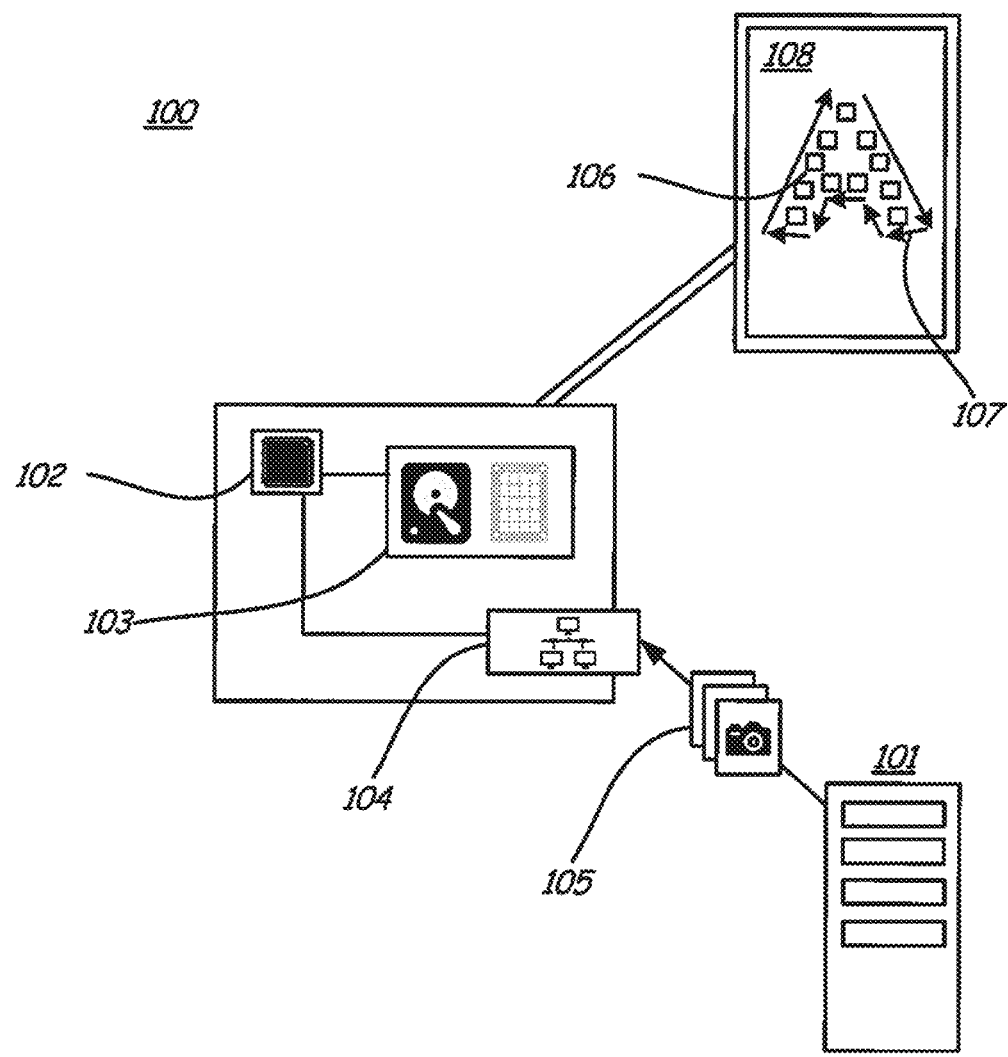
FIG. 1 is a computerized system for implements embodiments of the present invention.

FIG. 1 is a computerized system 100 showing one implementation of an exemplary embodiment of the present invention. One component of the system 100 includes a processor 102, a storage device 103 and a network interface 104. These can be located in a single device or spread out among different devices. The processor 102 is configured to execute instructions stored in software that is stored in, for example, storage device 103. In some embodiments, storage device 103 can include a hard disk drive, a solid state drive, random access memory, a hybrid solid state drive, DRAM, solid state memory like FLASH, or other appropriate technologies. Storage device 103 can be used to store executable instructions in a non-transitory computer-readable medium. Storage device 103 can also be used to store the data 105 collected from servers 101 so that it is in a ready state to be used by system 100 as either cached or pre-fetched data.

Interconnect lines are shown in system 100 to indicate generally that the various components 102, 103 and 104 are operatively connected to each other via electronic means. Network interface 104 is designed to provide communication to other networks either local to or remote from the components 102, 103 and 104. Interface 104 can be implemented as a TCP/IP device, intranet device, internet device, WiFi, wireless, HTTP, FTP, LAN or WAN interface or an application program interface ("API") related hardware.

In one embodiment, network interface 104 communicates with servers 101 that contain target data 105 that the present invention seeks to acquire and use for downstream processes. Interface 104 can function to service requests by processor 102. Target data 105 can include visual or textual data, such as photos (i.e. .jpg files), social network messages, media headlines, compressed video files or the like. Servers 101 can be either local or remote, and can include API commands to allow access to the target data 105 in a controlled and managed manner.

The system 100 also includes a display device 108 to visually present the data 105 in the form of data objects 106 to a user. The display device can include a desktop or laptop monitor, projection surface (see FIG. 9), tablet screen, smart phone screen, television, an LCD screen, LED screen, or projector or similar display device. The line in FIG. 1 shown connecting display device 108 to components 102, 103 and 104 is merely shown to indicate that there is a communicative coupling here, but not necessarily that there is a physical interconnect between the components. For example, this connection could be wireless.

The processor 102 goes on to display the data 105 via the data objects 106 at first in a dispersed non-shaped format (see FIG. 4A, FIGS. 5-7 and FIGS. 10-11). In some embodiments this is established further by using the processor to animate the data objects "flying in" from an off screen position. The processor 102 is then configured to animate a transition of the data objects 106 from the dispersed non-shaped format into an ordered or shaped format as seen in FIG. 1—shown in this embodiment as the letter A. In some embodiments the data objects 106 will change in size during this animation or transition—in this case decreasing in size. The transition can also be implemented as a morphing in some embodiments where the shaped format is in the shape of a given brand logo. As shown in FIG. 1 via arrows 107, in some embodiments the data objects 106 making up the brand logo will remain in continuous or continual movement within the brand logo to give the impression that it is a living or dynamic logo. Logos can take the shape of letters, numbers, icons, or any graphic design that can be used as a logo. In some embodiments, logos that have continuity to them, such that each aspect of the logo is connected linearly to other aspects of the logo, will be more easily animated by the processor in this fashion.

Figure 2:
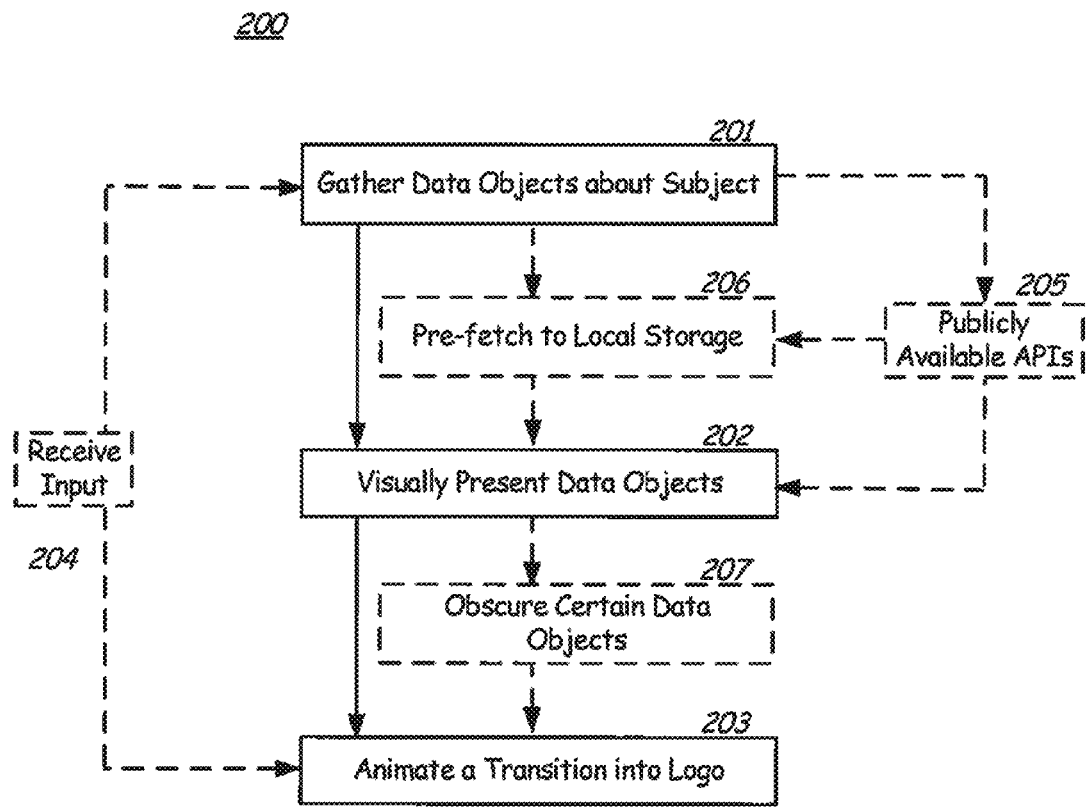
FIG. 2 is a software method for gathering data objects, visually presenting them, and animating a transition to a logo according to certain embodiments.

FIG. 2 depicts a software method 200 implemented as instructions executable by one or more processors stored on a non-transitory computer-readable medium to animate a plurality of selected data objects into a logo.

The method 200 begins with gathering step 201 data to be contained in data objects are gathered about a selected subject. The selected subject can include a consumer or business among other subjects. This gathering step 201 can be implemented by a processor that uses publicly available APIs of known internet services in optional step 205 to gather the data from remote servers in some embodiments. Using APIs can allow the method 200 to have dynamic up-to-date information to use—for example, trending topics on social media or headlines in news media. Optionally, this data can be pre-fetched or cached to local storage in step 206 such that the method 200 doesn't need to wait on the gathering step to continue with the visual presentation.

Method 200 continues to the visual presentation step 202 where the data objects are displayed to the viewer via a display device. In some embodiments the method animates these data objects as "flying in" from an offscreen presentation to contribute to the living or dynamic nature of the presentation.

Finally, method 200 animates a transition in step 203 of the selected data objects into the shape of a logo. This logo can take the shape of letters, numbers, Icons, or any graphic design that can be used as a logo. Optionally, method 200 will obscure various data objects in step 207 based on a set of criteria that could include: maintaining privacy, avoiding third party owned properties, or choosing not to display certain other regulated subject matter in the data objects. The obscuring may include blurring or pixelating the visuals of the data objects so that a user can no longer discern what it originally was.

In some embodiments, method 200 can be improved by receiving input 204 from a user at various steps in the process, such as steps 201 and 203. This input 204 can be received via a keyboard, a touch screen, a mouse, a voice command, or a motion capture device in order to manipulate the transition or the selected subject. For example, a graphical user interface ("GUI") may ask a user to input his or her account and password to access certain data on a social networking website. The input could also be a mouse click on one of up to five or six pre-selected subject matters to determine what type of data or gather. Further, the input could be motion based gestures from a user to create corresponding changes to the animation of the brand logo made up of the data objects—for example by flowing away from a hand motion. In some embodiments the user can be prompted to provide permission, account authorization, interest categories, or selected websites to facilitate gathering data.

The number of data objects gathered in step 201 can vary based on the goals of the marketing effort—but can at least include five or more data objects, ten or more data objects, or on the order of one hundred or more data objects. The data gathered in steps 201 or 205 can be sought from computer databases serving social networking, blogs, microblogs, newspapers, magazines, photo sharing, music streaming, video streaming, electronic commerce, or media server functions. The data gathered in step 201 or 205 can include photos, headlines, text based messages, music artists, social media interactions, and products available for purchase (like top selling products in certain categories, etc.).

Figure 3:
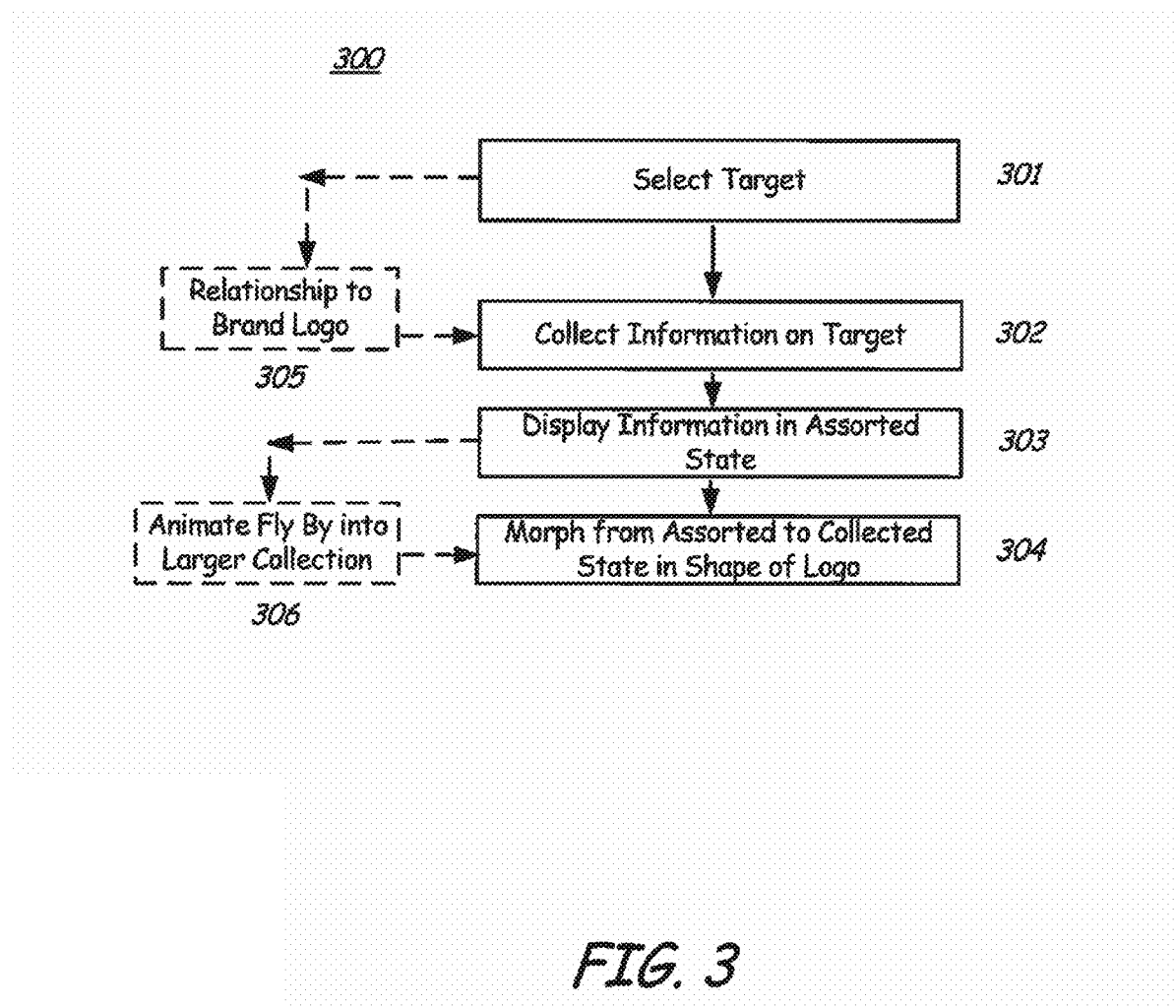
FIG. 3 is a method for marketing to a target via a computerized system and processor according to certain embodiments.

FIG. 3 depicts a marketing method 300 to increase brand awareness of a given company and how that company is relevant to a particular individual or business. This is a marketing method 300 that is tied to the electronic gathering of data as executed by a processor and the resulting display of that data in a unique fashion via a physical display device.

The method 300 begins by selecting a target in step 301, where that target can be a consumer or a business. In some embodiments, the target is selected in step 301 as a generalized consumer or business such that the resulting collecting, displaying and morphing can apply to a broader audience. In step 301 the marketing target is selected so as to visualize an impression related to a given brand and its logo. Next, in step 302, information is collected, via a processor working in conjunction with a network interface, to derive a number of discrete visual or text based pieces of information related to the marketing target. It is best if those pieces of information are somehow relevant to the marketing target—for example geographically relevant or personally relevant.

The remaining steps in the method involve a displaying step 303 and a morphing step 304. The displaying step 303 will visually display the pieces of information to the marketing target in an assorted state. This can be achieved on an electronic display device like a desktop or laptop monitor, projector, tablet screen, smart phone screen, television, LCD screen, LED screen, or similar display device. The final step 304 involved using a processor to morph the pieces of information from the assorted state into a collected state taking a shape of the given brand logo. In some embodiments this is done automatically by the processor based on a preprogrammed timing.

In some embodiments, during the collecting step 302—pieces of information are selected that establish a relationship to the brand logo in step 305. This can include exposing an individual to aspects of the brand owner's business that the individual may not have been aware were affected by the brand owner. Other relationships can also be established as needed to meet goals of the brand owner. Optionally, during the visually displaying step 303, the processor can animate the pieces of information flying by the electronic display device in step 306 into a larger collection of other pieces of information—giving the impression of the brand being a dynamic and living brand to the user. Various timings can also be used with the morphing step 304 to make it take between one and ten seconds, less than a second and three seconds, or more than fifteen seconds—depending on the application and the external constraints at play (i.e. user attention).

Figure 4A:
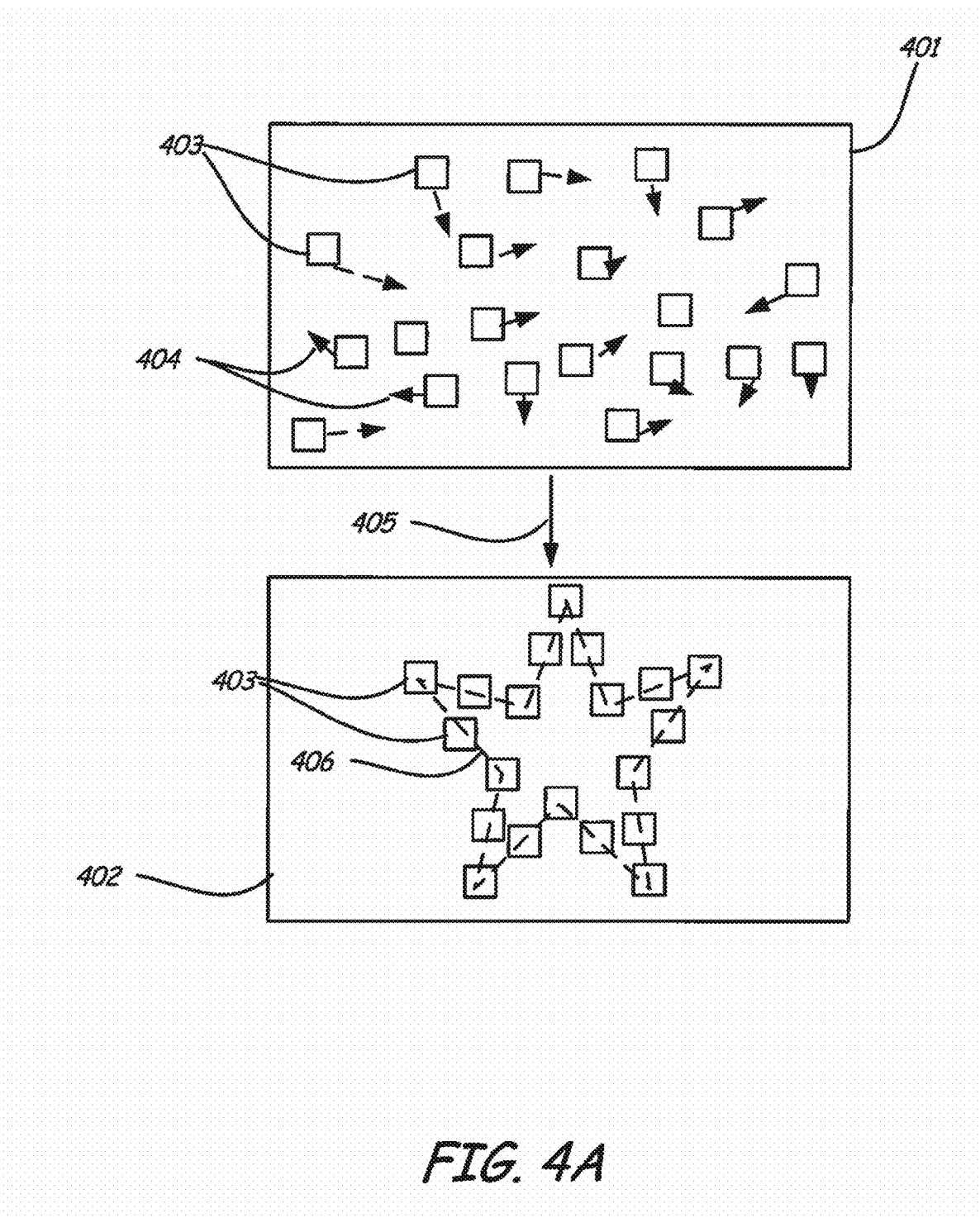
FIG. 4A depicts gathered data objects in two different states according to certain embodiments.

FIG. 4A shows one embodiment of the non-ordered or assorted state 401 of the data objects 403 used by various systems and methods of the present invention. Data objects 403 can comprise graphical representations of photos, text or other pieces of information. Movement vectors 404 show that these various data objects 403 are moving in a semi-random fashion. In some embodiments, these movement vectors 404 may be more aligned between the data objects 403, including during a "fly in" process from off screen or from off a display.

After a morphing or transition 405, the display of data objects 403 now take an ordered shape state 402. In this embodiment, the shape 406 is that of a star, which could also be the shape of a particular company's brand logo.

Figure 4B:
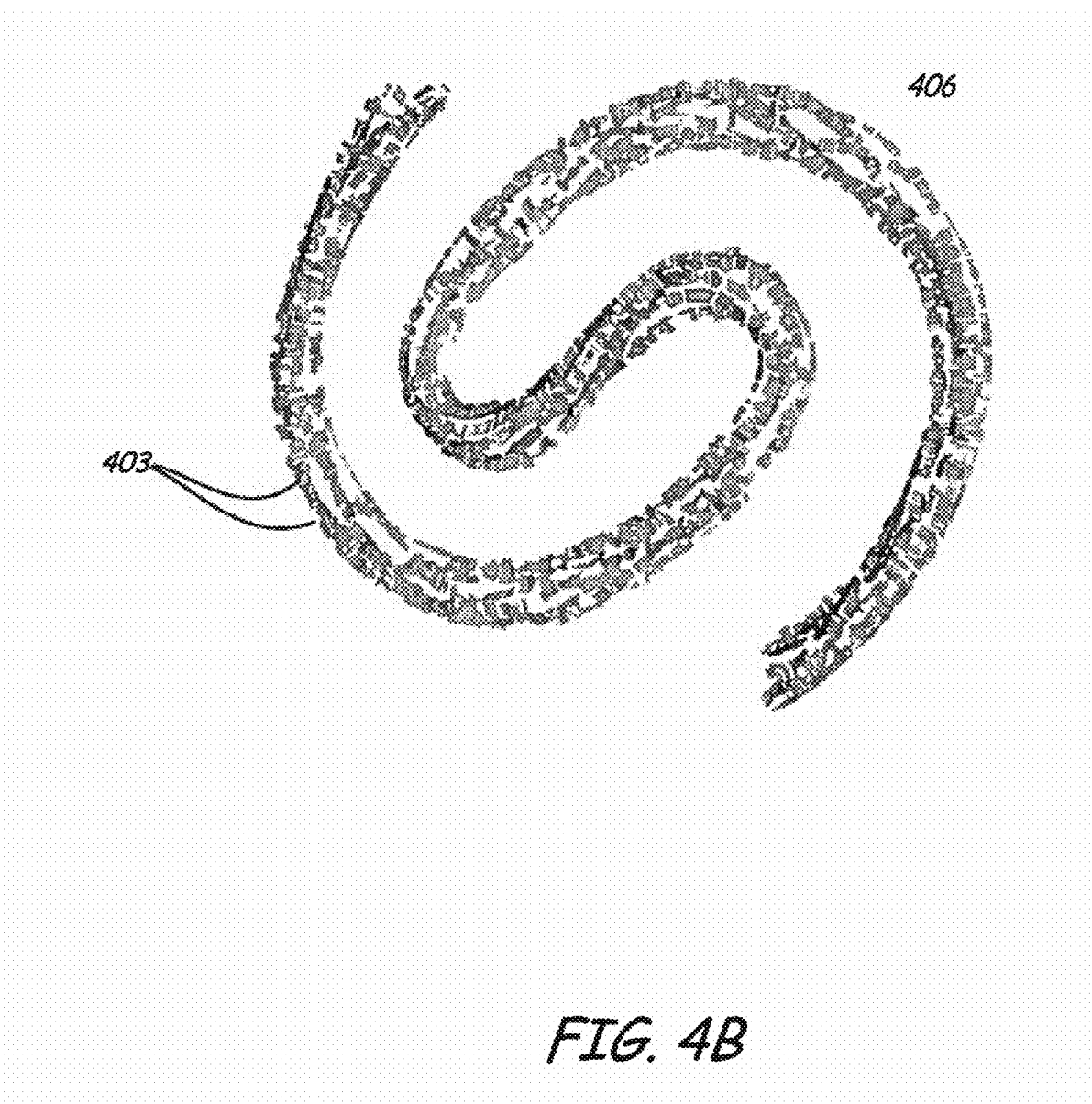
FIG. 4B depicts one embodiment of a brand logo comprising a plurality of selected data objects after methods of the present invention have been implemented.

FIG. 4B shows another embodiment of the ordered state 406 of data objects 403—in this case taking the shape of an S-swirl logo. In this embodiment it can be seen how the multitude of data objects form together to make the shape. In certain embodiments, the process instructions can be customized to define a particular set of data object lanes for the data objects 403 to form into to create the shape or logo. The number of lanes can vary based on processing power, application and visual display goals—but can include at least one lane, four lanes, eight lanes, ten lanes and sixteen lanes.

Figure 5:
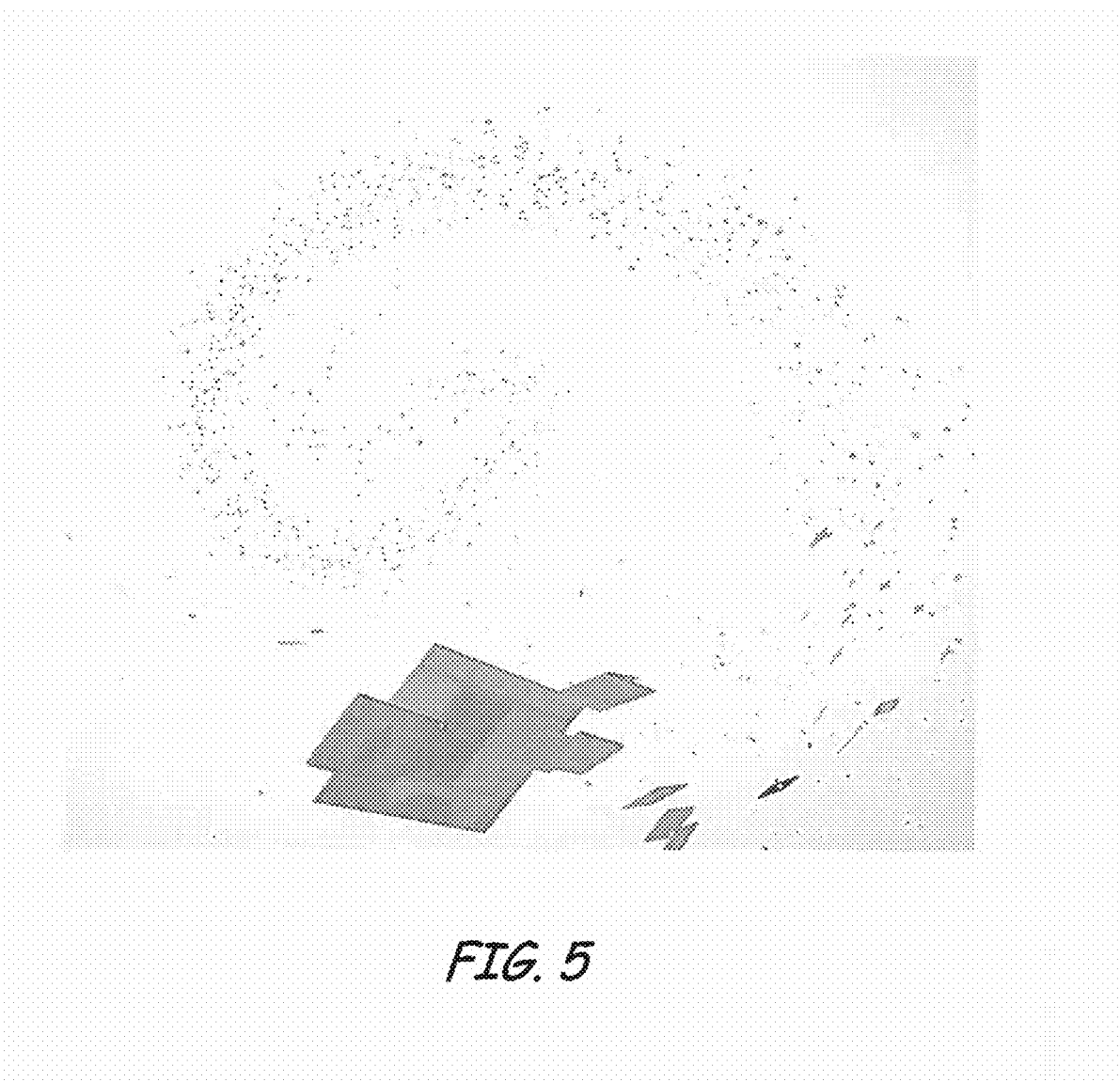
FIG. 5 shows one embodiment of an animated transition with photo based data objects.

FIG. 5 shows an embodiment of the visual presentation of the data objects flying in from offscreen. The data objects here are visual or photo based objects depicts in a rectangular format. It can also be seen that the visuals in the data objects are visible to the user as they are presented in this embodiment. Additionally, each of the data objects can be seen (or read in text based embodiments) while in continuous movement during the visual presentation animation executed by the processor.

Figure 6:
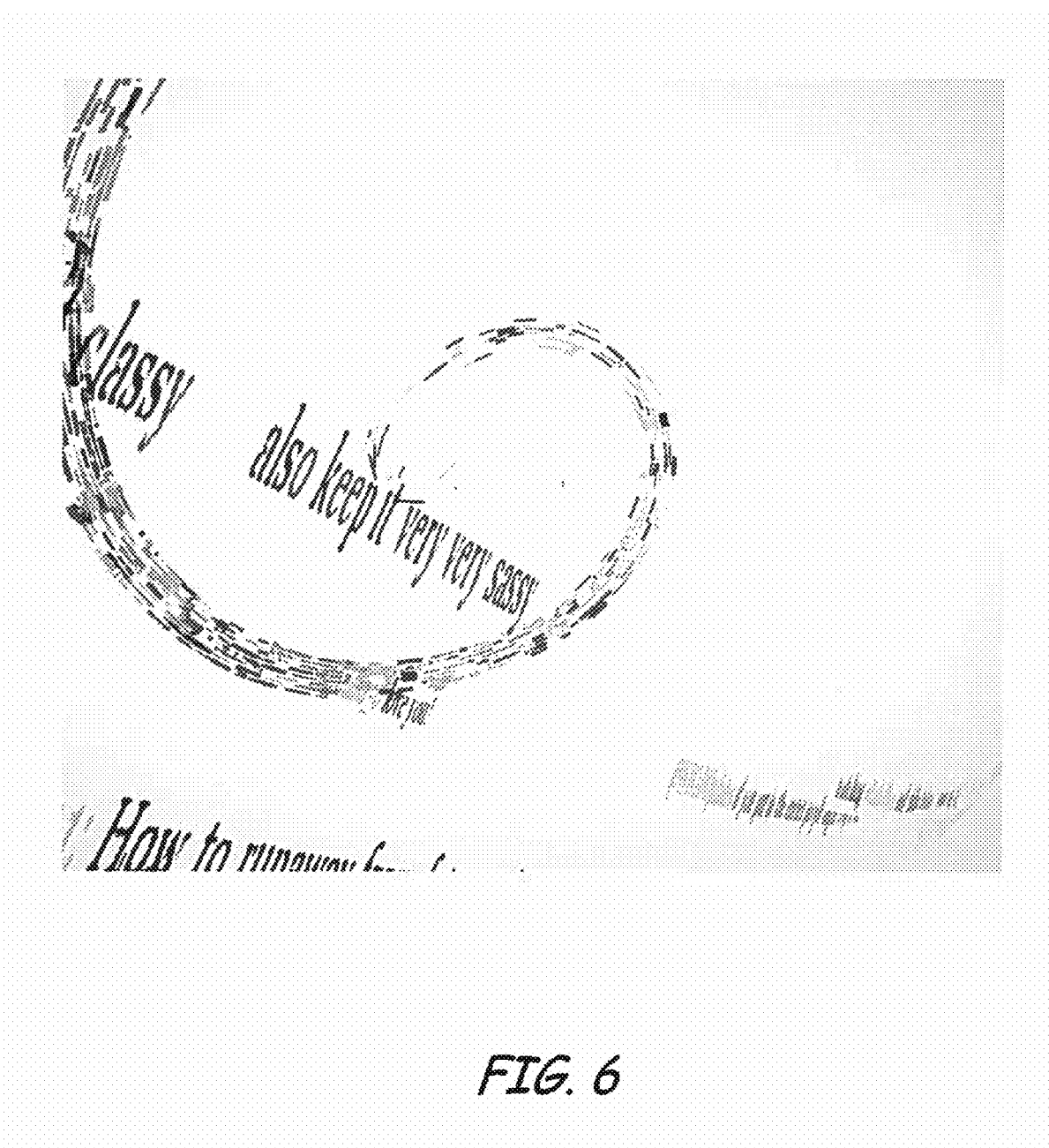
FIG. 6 shows another embodiment of an animated transition with textual based data objects.

FIG. 6 shows a similar embodiment to FIG. 5, except in this instance the visual data is replaced with text based data. Again, it can be seen that parts of the text based data objects can be read while being transitioned into the ordered or logo shaped state.

Figure 7:
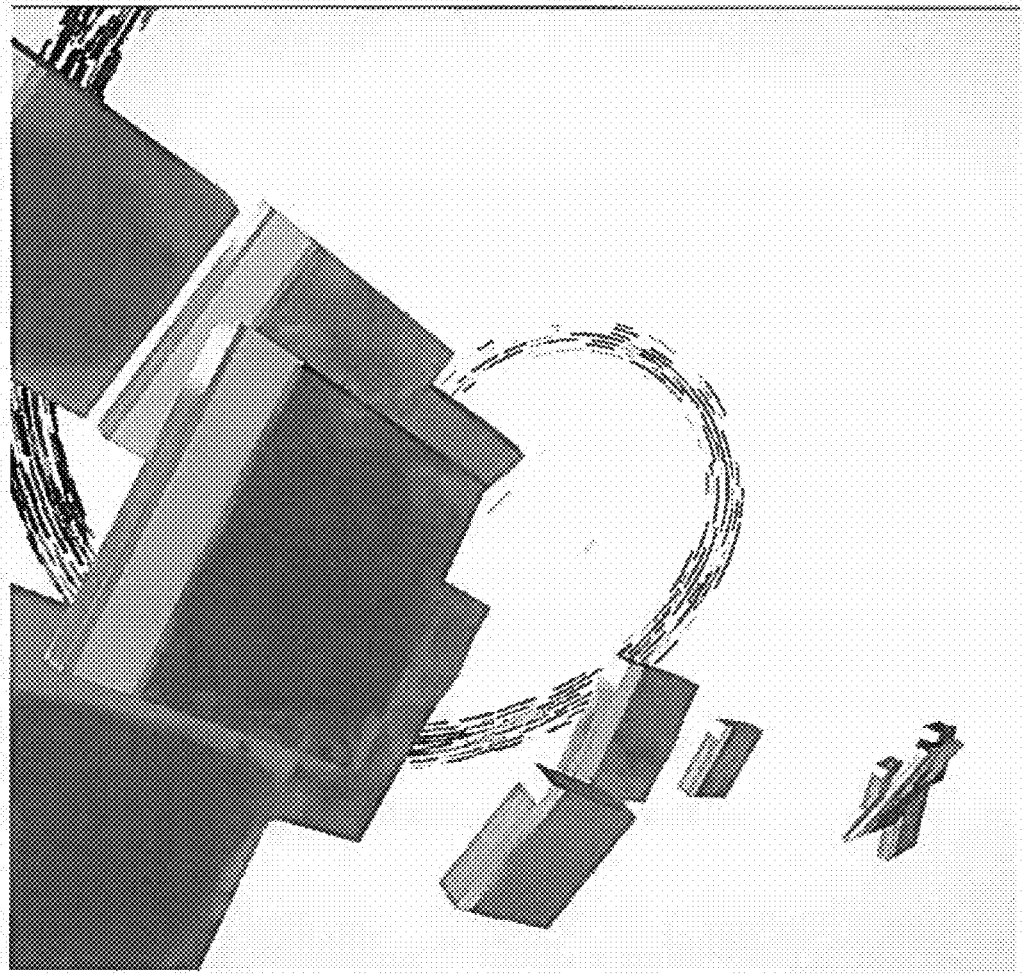
FIG. 7 shows another embodiment of an animated transition with obscured data objects.

FIG. 7 shows an embodiment where the data objects are obscured for one or more the reasons detailed above. Theses data objects are shown as squares, but they could also be of any other appreciable shape—such as a circle or oval shape, or where each data object is a different shape.

Figure 8:
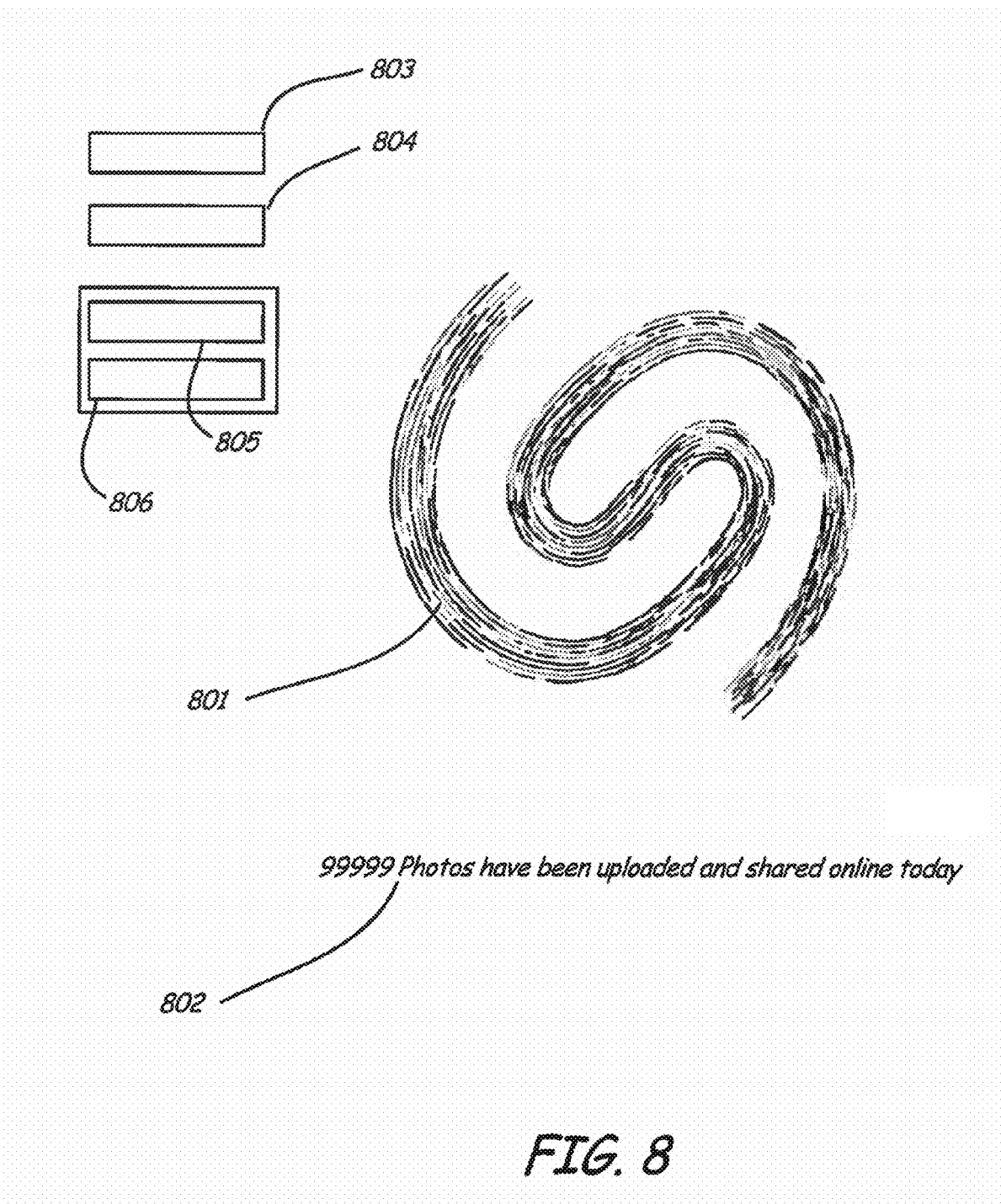
FIG. 8 shows an example user interface with inputs and other information according to certain embodiments of the present invention.

FIG. 8 depicts an example graphical user interface. A brand logo 801 is shown comprising a multitude of data objects in continuous movements. A message 802 related to those data objects is shown underneath the logo 801 to provide context to the data or a relevant piece of data about the objects—in this case—how many photos have been uploaded and/or shared via a particular service (or overall) today. Input buttons 803 and 804 are also show in addition to text based inputs 805 and 806. In one embodiment buttons 803 and 804 could reset and toggle the animation between two different sets of data objects (such as between social media photos and current news headlines). In another embodiment, input 805 can be for a particular username and input 806 can be for the associated password.

Figure 9:
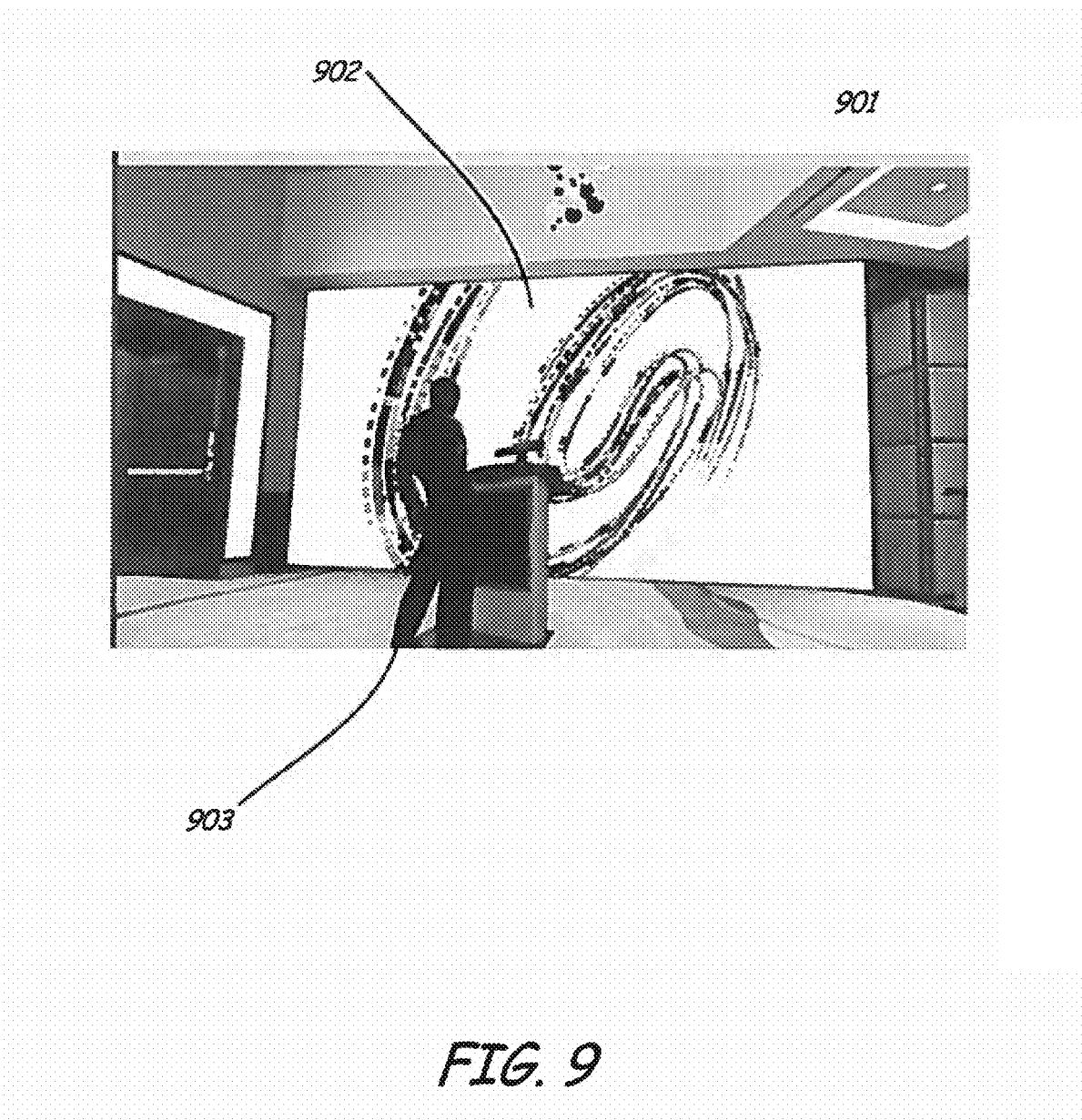
FIG. 9 shows an example presentation embodiment of the present invention with a projection system and a user.
Figure 10:
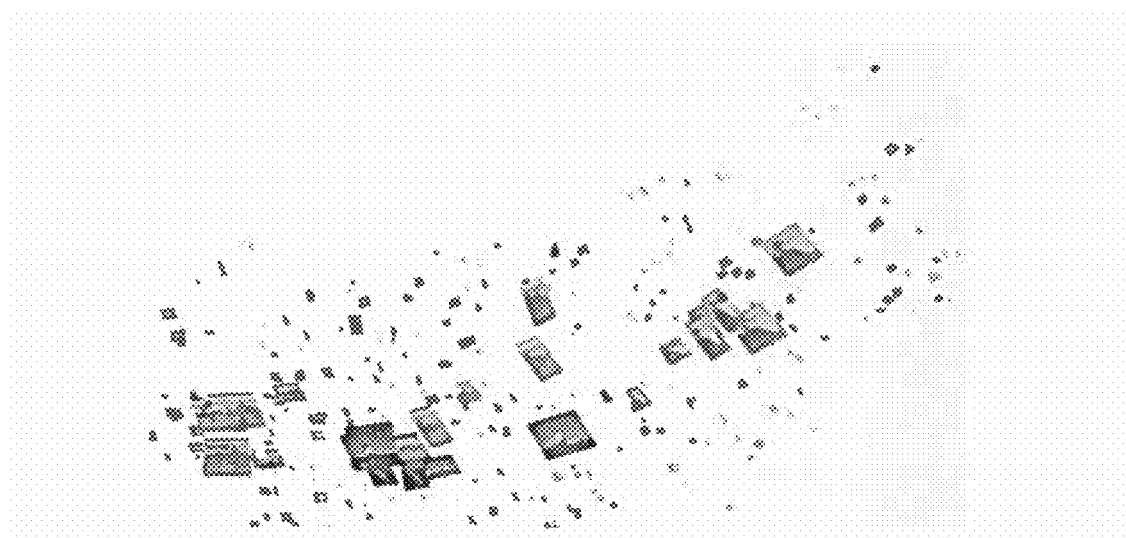
FIGS. 10-13 show various stages of the visual presentation of data objects and the animated transition to a brand logo according to certain embodiments of the present invention.
Figure 11:
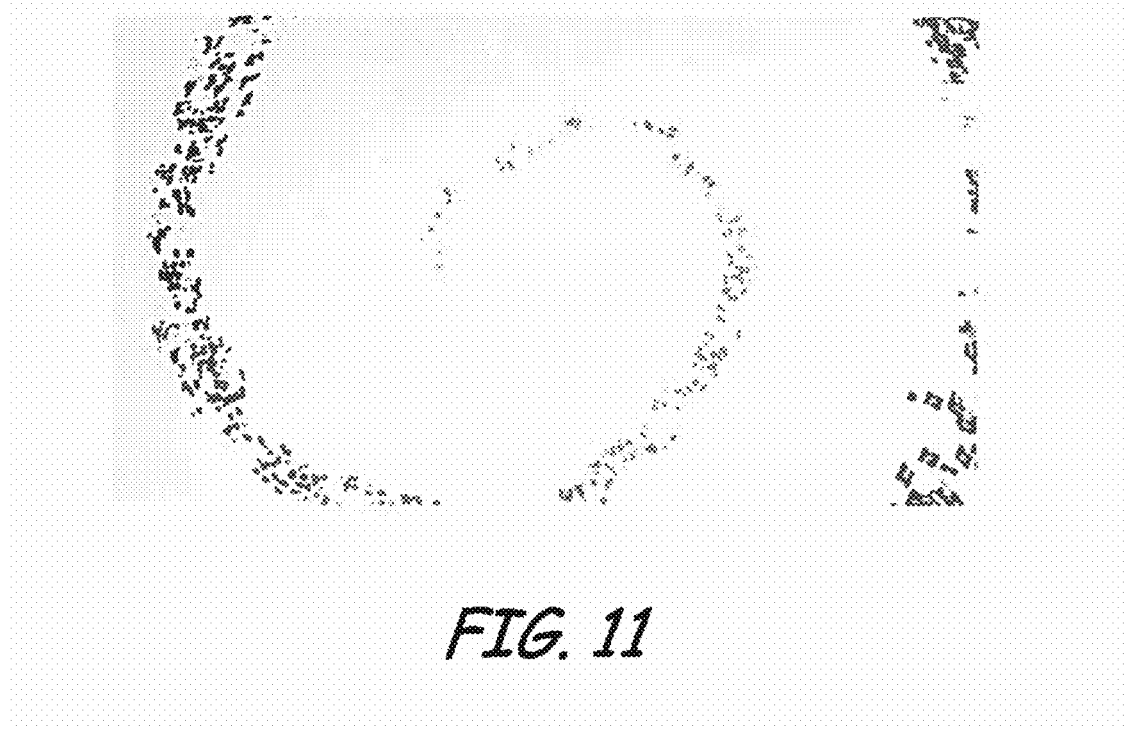
Figure 12:
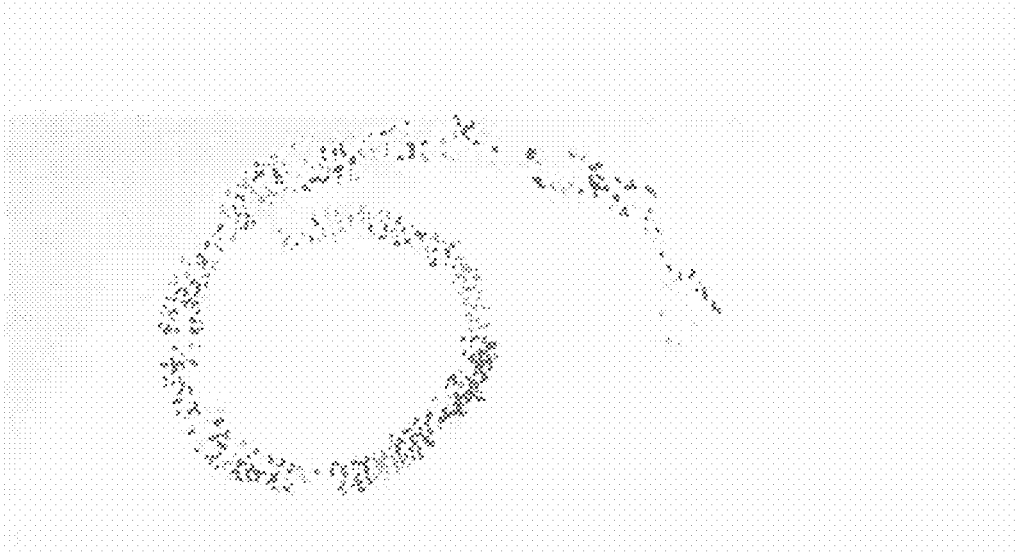

FIG. 9 shows an embodiment where the present invention is implemented in a trade conference exhibitor hall 901. The visual presentation is shown projected onto a projection surface 902. A user 903 can also provide hand gesture input particularly well in this embodiment to manipulate the presentation of the data via the processor.

Figure 13:
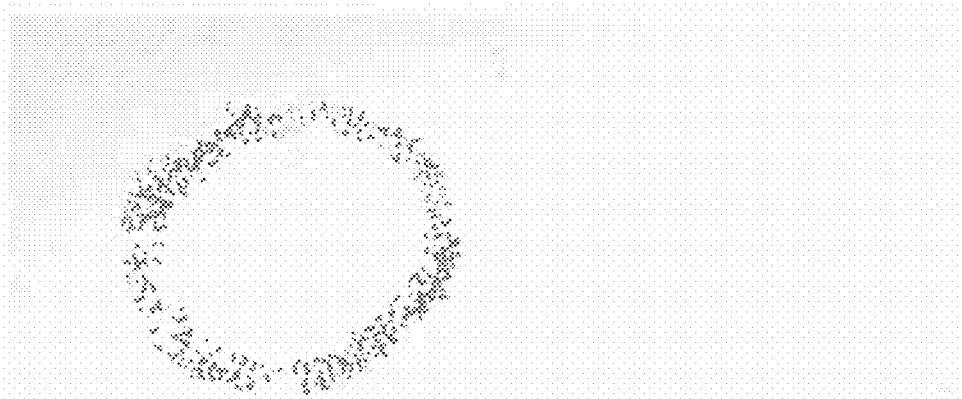

FIGS. 10 to 13 show various stages of the visual presentation of the data objects from a state not showing the brand logo—or "flying in" from an off screen position—culminating in the shaped logo in FIG. 13, in this case taking the form of a circle or oval.

In this description, reference is made to the accompanying set of drawings that form a part hereof and in which are shown by way of illustration several specific embodiments. It is to be understood that other embodiments are contemplated and may be made without departing from the scope or spirit of the present invention. The detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Thus, embodiments of the SYSTEM AND METHODS FOR ANIMATING SELECTED DATA INTO A LOGO are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A non-transitory computer-readable medium that stores instructions executable by one or more processors to perform a method for animating a plurality of selected data objects into a logo, comprising:
    instructions performed by the one or more processors for gathering the plurality of selected data objects about a selected subject in a storage device by utilizing application programming interfaces (APIs) of remote sources;

instructions for presenting the plurality of selected data objects in a first state; and instructions for animating a transition of the plurality of selected data objects into a second state of the logo while visually decreasing a size of the selected data objects, the logo comprises the plurality of selected data objects in continuous movement in data object lanes along a shape of the logo.

2. The computer-readable medium of claim 1, wherein the selected subject is a consumer or a business and further comprising instructions for storing the plurality of selected data objects about a selected subject in a local data storage device prior to presenting the plurality of selected data objects visually such that the selected data objects can be pre-fetched and be ready for display when needed.

3. The computer-readable medium of claim 1, further comprising instructions for receiving input via a hand gesture or a motion capture device in order to manipulate the transition or the selected subject.

4. The computer-readable medium of claim 1, wherein the instructions forgathering comprise accessing publicly available information about the selected subject.

5. The computer-readable medium of claim 4, wherein accessing publicly available information comprises accessing social networking websites.

6. The computer-readable medium of claim 1, wherein the instructions for gathering comprise utilizing application programming interfaces (APIs) of selected websites and the plurality of selected data objects comprise dynamic up-to-date information.

7. The computer-readable medium of claim 6, where in the selected websites are selected from the group consisting of social networking, blogs, microblogs, newspapers, magazines, photo sharing, music streaming, video streaming, electronic commerce, and media servers.

8. The computer-readable medium of claim 1, wherein the plurality of selected data objects are selected from the group consisting of photos, headlines, text based messages, music artists, social media interactions, and products available for purchase.

9. The computer-readable medium of claim 1, wherein the instructions for presenting comprise displaying a collection of over ten discrete data objects related to the selected subject such that each can be seen or read while in continuous movement.

10. The computer-readable medium of claim 1, wherein the instructions for presenting comprise displaying a collection of over five discrete data objects related to the selected subject such that certain data objects, selected based on avoiding third party owned properties are obscured so each can not be clearly seen or read while in continuous movement.

11. The computer-readable medium of claim 1, wherein the instructions for presenting comprise displaying the data objects visually on a monitor, projection surface, tablet screen, smart phone screen, or television.

12. The computer-readable medium of claim 1, further comprising instructions for prompting the selected subject to provide input for one of a permission, account authorization, interest categories, or selected websites to facilitate gathering the plurality of selected data objects about the selected subject.

13. The computer-readable medium of claim 1, further comprising instructions for user input to toggle between two different sets of selected data objects for use with the instructions for presenting and the instructions for animating a transition.

14. The computer-readable medium of claim 1, further comprising instructions for displaying a message related to the selected data objects to provide a relevant piece of data about the selected data objects.

15. A method comprising:

selecting a marketing target to visualize an impression related to a given brand logo;

collecting, by utilizing application programming interfaces (APIs) of remote sources, via a processor and a network interface, a number of relevant discrete visual or text based pieces of information related to the marketing target or a general marketing message;

displaying the pieces of information to the marketing target in an assorted state via an electronic display device; and animating a transition of the pieces of information from the assorted state into a collected state taking a shape of the given brand logo by decreasing a size of the pieces of information and arranging the pieces of information in continuous movement in lanes along the shape of the given brand logo.

16. The method of claim 15, wherein the collecting step comprises selecting pieces of information that establish a relationship to the brand logo.

17. The method of claim 15, wherein the morphing step takes between one and ten seconds.

18. The method of claim 15, wherein the displaying step comprises animating the pieces of information flying across the electronic display device into a larger collection of other pieces of information such that relative spacing between the pieces of information diminishes as the displaying step progresses.

19. A computerized system comprising:

a processor configured to gather visual or textual files related to a brand logo or target;

a network interface configured to facilitate processor requests to gather visual or textual files from remote servers by utilizing application programming interfaces (APIs) of selected websites;

a storage device configured to cache the visual or textual files related to the brand logo or target; and a display device configured to show the visual or textual files flying in from an off screen position in a first random assortment to a user, the processor configured to animate a transition from the first random assortment to a second ordered shaped format with the visual or textual files arranged in continuous movement in lanes along the second ordered shaped format.

20. The computerized system of claim 19, wherein the network interface utilizes a LAN, WAN, WiFi, HTTP, or FTP; the storage device comprises a hard disk drive, a solid state drive, flash memory, or DRAM; and the display device comprises a tablet or smart phone touch screen, an LCD screen, LED screen, desktop monitor, laptop monitor, or projector.

* * * * *